United States Patent [19]
Pearson

[11] 3,757,217
[45] Sept. 4, 1973

[54] METER AND METHOD OF CALIBRATION
[75] Inventor: David B. Pearson, Raritan, N.J.
[73] Assignee: Weston Instrument, Inc., Newark, N.J.
[22] Filed: Aug. 20, 1971
[21] Appl. No.: 173,424

[52] U.S. Cl. .............................. 324/151 R, 324/74
[51] Int. Cl. ........................ G01r 1/00, G01r 35/00
[58] Field of Search .................. 324/151 R, 151 A, 324/74

[56] References Cited
UNITED STATES PATENTS

| | | | |
|---|---|---|---|
| 1,479,524 | 1/1924 | Van Guilder | 324/151 R |
| 2,590,228 | 3/1952 | Brown | 324/151 R X |
| 3,005,952 | 10/1961 | Basinger | 324/151 R |
| 3,493,864 | 2/1970 | Donnath et al. | 324/151 R X |

*Primary Examiner*—Alfred E. Smith
*Attorney*—William R. Sherman, Jerry M. Presson et al.

[57] ABSTRACT

A D'Arsonval type moving coil meter with linear scale deflection characteristics. The magnetic circuit of the meter is such that the sum total of flux which cuts the coil is the same for any operative position of the coil. Correspondingly, angular deflection of the coil is in direct proportion to the current in the coil. The magnetic circuit includes a magnet having fixed locating surfaces thereon which cooperate with fixed locating surfaces on a yoke. This locating arrangement assures that the sum total of flux which cuts the coil is the same for any operative position of the coil and further assures repeatable accuracy in successively assembled meters. The meter is calibrated by magnetizing the magnet to obtain full scale deflection when rated current is applied to the meter terminals. Where a calibrating resistor is used, the resistor is connected to the meter prior to calibration with the result that accuracy of the meter is assured without the need for using a precision resistor.

17 Claims, 7 Drawing Figures

INVENTOR
DAVID B. PEARSON
BY WALTER KRUGER
ATTORNEY

PATENTED SEP 4 1973

METER AND METHOD OF CALIBRATION

This invention relates generally to an electric meter of the moving coil type having linear deflection characteristics, and particularly to such a meter with a magnetic circuit of unique construction. The invention also relates to a method of manufacturing and calibrating such a meter.

In the past there have been numerous attempts to provide a meter of for example, the D'Arsonval type in which the meter has truly linear characteristics i.e., the deflection of the pointer is directly proportional to the current applied to the meter. Such attempts have included magnetic circuit constructions in which the magnet for the meter has adjustable shunts or is of multi-layer construction to permit adjusting the magnetic characteristics in the gap in which the coil is positioned. Alternatively, such prior art arrangements have included adjustably mounted magnets which are mounted so the position of the magnet can be changed relative to the remainder of the magnetic circuit to achieve the desired characteristics. In addition, in some constructions, the magnetic circuit itself is shiftable relative to the magnet. However, even with constructions of this type, an electric meter with truly linear scale deflection characteristics was rarely if ever obtained, except by accident. In any event, it is still necessary with prior art constructions, to have at hand perhaps four or five different scale faces, the graduations on which are determined by calibrating a series of successively produced meter movements. Then, each movement which is made is tested individually to determine its characteristics and one of the predetermined scales is fitted to the movement to provide a meter with reasonable accuracy but which is still not linear.

Applicant, in accordance with this invention, has devised a meter and a method of making same in which the meter is capable of mass production, assembly of the meter is vastly simplified, no mechanical adjustment of the magnetic circuit is necessary, and the meter is quickly and rapidly calibrated by the technique of properly magnetizing the meter magnet after the meter is assembled.

The technique of magnetizing the meter magnet after the meter is assembled is performed while a current of predetermined value energizes the meter coil to assure that for example, full scale deflection is obtained when the rated current for the meter movement is passed through the coil. By virtue of the linear scale deflection characteristics of the meter the meter can be calibrated at virtually any location on the scale, for example, one-half scale deflection or full scale deflection. The technique however is the same in that the meter magnet is magnetized after the meter is assembled and the extent that the permanent magnet is magnetized is precisely that required to provide the desired scale deflection for the current in the coil.

Since the deflection characteristics of the meter are linear, the same meter movement can readily be used with scales of at least several different sizes, and only one scale of each size is required for a particular application of the meter. In contrast, in the past, four or five scales of each size were required so the proper scale could be selected to provide an accurate meter. In order to adapt the meter to scales of different sizes it is merely necessary to provide a pointer of the proper length and a counterweight of the proper weight to balance the pointer. In any event, since the angular spacing of the graduations on all the scales is the same, regardless of size, for a particular application of the meter, only one scale of each size is required in contrast to the four or five scales of each size required by the prior art meters.

An additional advantage of this magnetizing-after-assembly technique is that meters of different sensitivities can be readily provided by connecting an appropriate resistor to the meter coil before the magnet is magnetized. Hence, different meters of several different sensitivities can be obtained from a basic meter movement merely by selecting an appropriate resistor and connecting same either in series with or in shunt across the meter coil. Extreme accuracy of the resulting meter is assured by connecting the resistor to the coil prior to magnetizing the magnet, and as a result, a meter of excellent accuracy is assured even though the resistor is not a precision resistor. By magnetizing the magnet after the resistor is connected to the meter coil the tolerances of the resistor are meaningless since the meter is magnetized so the coil will deflect a predetermined distance for a predetermined current in the coil.

The unique linear characteristics of the meter of this invention are obtained by so shaping and constructing the permanent magnet and the remaining portions of the magnetic current that the total flux which cuts the coil is the same for all positions of the coil through which the coil rotates. By virtue of this construction, the electromagnetic torque acting on the coil to cause the coil to pivot is directly proportional to the current applied to the coil. As a result, the meter movement exhibits true linear deflection characteristics, and even the taut band or return spring for the meter, depending on the type of suspension used for the coil, need not be of precision manufacture, but need only have linear deflection characteristics, since all variables are compensated for by the final magnetizing of the permanent magnet.

The unique magnetic circuit of the meter of this invention includes a permanent magnet which is generally elliptical and which has diametrically opposed locating faces at opposite sides thereof to precisely locate the magnet in a ring shaped yoke. Advantageously, the yoke is diametrically split and is constructed from two semi-circular half shells to provide the desired hollow cylindrical yoke. Hence, the magnetic circuit includes two generally crescent shaped air gaps through which opposite sides of the moving coil extend. Since the flux density in each of these air gaps is uniform, a predetermined current in the coil will cause the coil to pivot a predetermined angular amount against the restoring action of the suspension system. Hence, it is only required that the return spring or taut band have linear deflection characteristics, and since such characteristics are inherent in springs such as torsion springs and spiral springs, linearity of the meter is assured.

Correspondingly, an object of this invention is to provide a meter of the moving coil type having cooperating fixed locating surfaces on a yoke and magnet of a configuration to provide linear deflection characteristics such that the angular deflection of the coil is directly proportional to the current in the coil.

Another object is a linear scale meter in which a permanent magnet and a two piece soft iron yoke cooperate to define a flux gap in which the sum total of flux which cuts a coil in the gap is the same at any angular position of the coil.

Another object is a meter with linear deflection characteristics in which a permanent magnet core of generally elliptical configuration is precisely located within a ring shaped yoke by virtue of cooperating fixed locating surfaces on the yoke and magnet, the locating surfaces magnetically connecting the yoke and magnet such that the flux density in the portions of the gap through which the coil deflects is substantially uniform.

Another object is a meter of the D'Arsonval type in which a generally rectangular coil extends through opposed gaps between a two piece yoke and a permanent magnet core, in which the portions of the coil in the gaps are exposed to a uniform flux density, and in which this uniform density is substantially the same at all angular positions of the coil from a zero position to a full scale position of the coil.

A further object is a unique method of assembling and calibrating a meter by magnetizing a permanent magnet core after the meter is assembled while applying a predetermined current to the meter coil, in the environment of a meter with linear scale deflection characteristics, so the deflection of the coil of the calibrated meter is directly proportional to the current in the coil.

A further object is a unique method of calibrating a meter using a non-precision resistor by magnetizing a permanent magnet core to the extent necessary to obtain a predetermined scale deflection as a result of application of a predetermined current to the meter coil, whereby, non-precision characteristics of the resistor are automatically compensated for by the magnetizing operation.

Numerous other objects, features and advantages of this invention will become apparent with reference to the accompanying drawings which form a part of the specification and in which.

Figure 1:
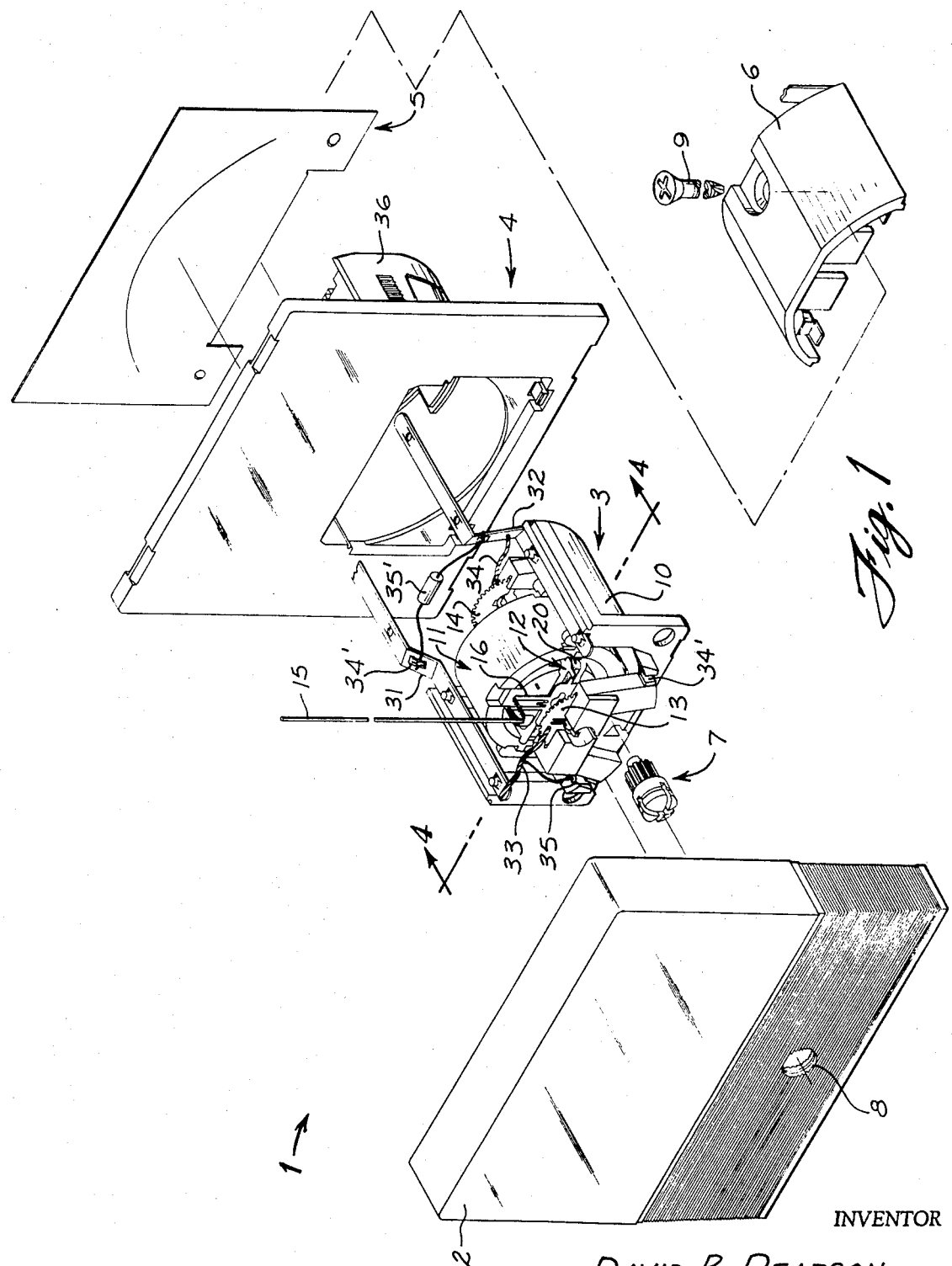
FIG. 1 is an exploded pictorial view showing the meter of this invention.

Referring now to the drawings in detail and particularly to FIG. 1, there is shown a meter 1 constructed in accordance with this invention. As shown at FIG. 1, the meter includes a cover 2, a meter movement 3, a case 4, a scale 5 and a terminal adapter assembly 6. In addition, there is a front zero adjust knob 7 which is adapted to be mounted for rotation in an opening 8 in cover 2. The various parts of the meter so far described are adapted to be assembled by sliding and/or snapping these parts together, with the exception of the terminal adapter 6 which is held in position by the screw 9, and which is only used where a particular terminal arrangement for the meter is needed. The various parts that make up meter movement 3 are assembled on a base 10 of insulating material.

The meter movement 3 includes a magnetic circuit 11, a moving coil assembly 12, a front support element 13 and a rear support element 14. The support elements 13 and 14 are mounted on base 10 for limited rotation to provide for adjusting the zero position of pointer 15. Pointer 15 is mounted on coil assembly 12 by a support structure 16 integral with a coil form part of the coil assembly.

Figure 2:
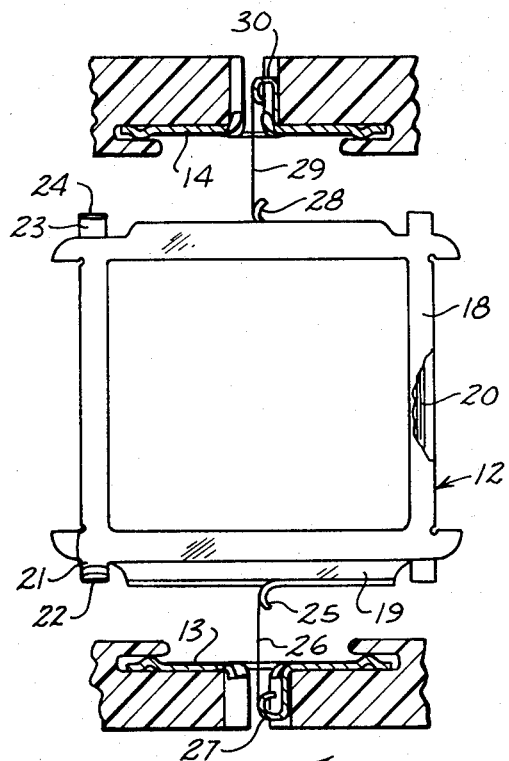
FIG. 2 is a partial plan view in partial section showing a taut band suspension arrangement for suspending the moving coil of the meter.
Figure 3:
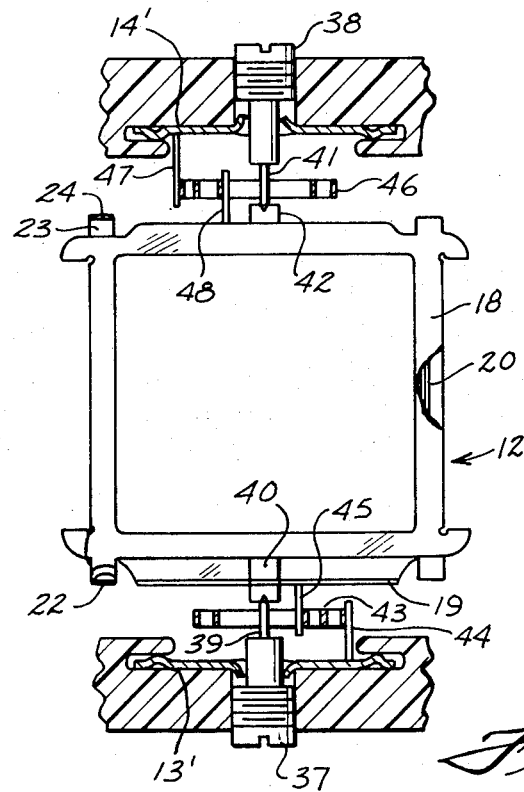
FIG. 3 is a view corresponding to FIG. 2, but showing a pivot bearing arrangement for mounting the moving coil for pivotal movement.

Coil assembly 12 can be supported for pivotal movement by the taut band suspension arrangement shown at FIGS. 1 and 2, or alternatively can be supported by the pivot bearing arrangement shown at FIG. 3. With reference to FIGS. 1 and 2, coil assembly 12 includes an upper coil form part 18, and a lower coil form part 19 in an insulated relation to the upper coil part, with the parts held together by the insulated coil 20. End 21 of coil 20 is electrically connected to upper coil form part 18 at a terminal 22. End 23 of coil 20 is electrically connected to lower coil form part 19 of a terminal 24.

At the front of lower coil form part 19 is a taut band support finger 25. A taut band 26 extends between finger 25 and a taut band support finger 27 integral with front support element 13. Similarly, there is a support finger 28 at the rear of upper coil form part 18. A taut band 29 extends between finger 28 and a support finger 30 integral with rear support element 14.

Front support element 13, rear support element 14, upper coil form part 18 and lower coil form part 19 are all formed from a springy material with good electrically conducting characteristics, such as phosphor bronze. In addition, taut bands 26 and 29 are formed from an electrically conducting material and take the form of a thin flat ribbon which electrically connects the respective coil form parts to the front and rear support elements. By virtue of this arrangement, end 21 of coil 20 is electrically connected to rear support element 14 and end 23 of coil 20 is electrically connected to front support element 13.

As shown at FIG. 1, conductors 31 and 32 are mounted respectively on opposite sides of base 10, which is integrally molded from a plastic with good electrically insultaing characteristics. Conductor 31 is electrically connected to front support element 13 by a flexible wire 33 which permits limited rotation of the front support element so the zero deflection point of the meter can be adjusted, for example, by rotating front zero adjust knob 7 which has gear teeth thereon and which teeth mesh with teeth on the periphery of the front support element 13 when the meter is assembled. Where it is desired to provide a meter with a sensitivity different from the sensitivity obtained with the coil 20, a resistor 35 can be connected in series between wire 33 and conductor 31. Alternatively, a shunt resistor 35' can be connected between conductors 31 and 32. Where resistor 35 is connected in series, there is of course no direct connection between wire 33 and conductor 31, but instead, wire 33 is connected to one lead of resistor 35 and its other lead is connected to conductor 31. The front of the base has an integral groove 34' to mechanically retain resistor 35 against movement.

Rear support element 14 is connected to conductor 32 by a flexible wire 34, so zero adjustment can be made by rotating the rear support element, via a suitable rear zero adjustment knob (not shown), if it is desired to have access to the zero adjuster from the rear of the meter.

By virtue of this arrangement, current or voltage applied to the conductors 31 and 32 energizes coil 20 of the meter. When the meter is assembled, the tail portions of the conductors 31 and 32 extend through the rear wall of body 36 of the casing so they are exposed for making desired electrical connections or for connection to adapter assembly 6.

Alternatively, a pivot bearing arrangement, such as shown at FIG. 3 can be used to mount coil assembly 12 for pivotal movement. In this arrangement, coil assembly 12 again includes the insulated upper and lower coil form parts 18 and 19 in insulated relation to each other and a coil 20 wound thereon. One end of coil 20 is connected to terminal 22 and the other end 23 is connected to terminal 24. In the pivot bearing arrangement, front element 13' is really a front connector element and rear element 14' is also a connector element since these front and rear elements do not physically support coil assembly 12 for rotation, but only provide for zero adjustment and electrical connection of the upper and lower coil form parts to the meter terminals. The coil assembly 12 is mounted for pivotal movement by a front pivot stud 37 and a rear pivot stud 38 which extend respectively through openings in the front and rear elements, but do not interfere with rotation of these elements to zero adjust the meter. The inner pointed tip 39 of stud 37 seats in a V-shaped depression in a front pivot bearing 40 supported on coil assembly 12. Similarly, the inner pointed tip 41 of stud 38 seats in a V-shaped depression in rear pivot bearing 42. These pivot bearings and studs mount coil assembly 12 for pivotal movement. A spirally wound front coil return spring 43 has its outer end electrically and mechanically secured to front support element 13' by a tab 44. The inner end of spring 43 is electrically and mechanically secured to lower support element 19 by a tab 45. Spring 43 electrically connects lower coil form part 19 to front element 13'. There is also a spirally wound leaf spring 46 at the rear of coil assembly 12. The outer end of the spring is electrically connected by a tab 47 to rear element 14' and the inner end of the spring is connected to upper coil form part 18 by a tab 48.

Figure 4:
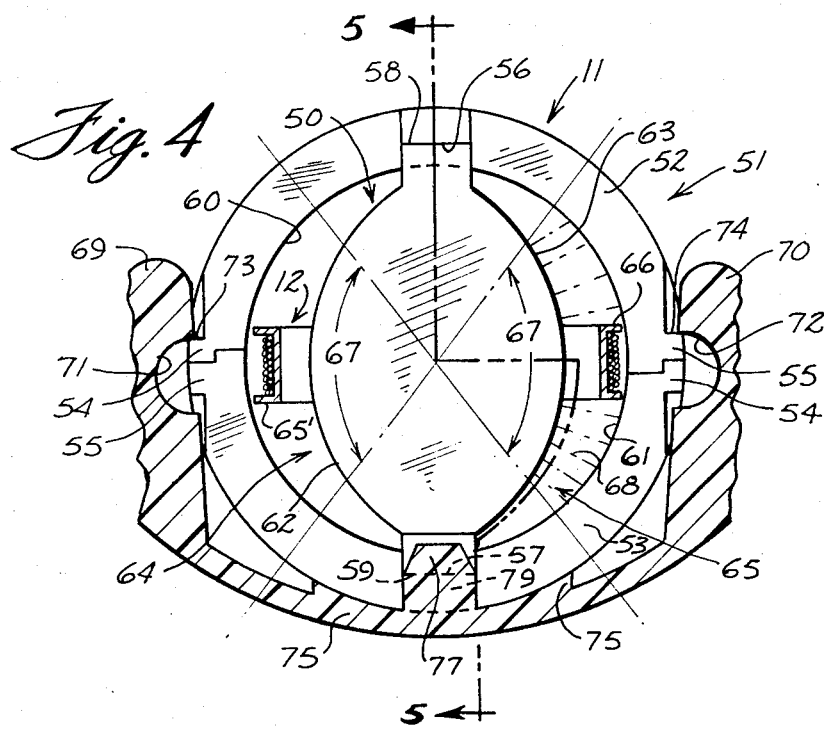
FIG. 4 is a partial view in vertical section of the meter movement taken along line 4—4 of FIG. 1, and showing the magnetic circuit of the meter.

FIG. 4 shows a preferred embodiment of the magnetic circuit 11 of this invention. The magnetic circuit 11 includes a magnet core 50 mounted within a yoke ring 51 which includes a semi-cylindrical upper yoke element 52 and a semi-cylindrical lower yoke element 53. The yoke elements are identical to each other, and the element 53 is merely the element 52 turned 180° circumferentially. The yoke elements have mating abutment steps 54 and 55 which inter-engage, as shown at FIG. 4, to form the diametrically split yoke ring 51. Rectangular slots 56 and 57, each of uniform depth, are formed respectively in the upper and lower yoke elements to precisely locate the upper and lower rectangular ends 58 and 59 of magnet 50 within the yoke ring 51. The yoke and magnet are so dimensioned, that magnet 50 is clamped between yoke elements 52 and 53 when the yoke elements are seated in the base, as shown at FIGS. 1 and 4. The width of ends 58 and 59 of the magnet is the same as the width of slots 56 and 57 so the magnet is maintained in precise alignment with the central axis of the yoke ring.

The yoke ring 51 has smooth cylindrical surfaces 60 and 61 which face toward the respective outside surfaces 62 and 63 of magnet 50. While surfaces 62 and 63 of the magnet are arcuately curved and the body of the magnet has a uniform cross-sectional configuration, the surfaces 62 and 63 are not precisely cylindrical, but are instead of elliptical curvature. Surface 60 cooperates with surface 62 to form a generally crescent shaped gap 64 through which a side 65' of coil assembly 12 extends. Similarly, surface 61 and 63 cooperate to define a generally crescent shaped gap 65 through which side 66 of the coil assembly extends. Of extreme significance is the fact that there is a substantially uniform flux density in gap 65 throughout at least the angle of travel 67 of the coil assembly 12. Hence, the portion of coil 20 on side 66 of the coil is cut by the same number of flux lines 68 at any position within gap 65 within the angle of travel 67. Similarly, there is a substantially uniform flux density in the gap 64 and the portion of coil 20 on side 65' is exposed to or cut by the same number of flux lines regardless of its position within the angle of travel 67 of the coil assembly. It is to be appreciated that the flux density in gap 64 need not be the same as the flux density in gap 65. In addition, the flux density in these gaps can, of course, be different in different planes perpendicular to the axis of yoke ring 51 (which corresponds to the axis of rotation of coil assembly 12) without adversely affecting the linearity of the meter. It is however quite significant that the sum total of flux which cuts the sides 65' and 66 be the same throughout the angle of travel 67 of coil assembly 12 in each gap. This is accomplished by making the magnet and yoke so the flux acting to rotate the coil assembly is substantially the same for the side 66 at any position within its angle of travel and the flux acting on side 65' is substantially the same at any position within its angle of travel. A deviation of less than 2 percent in the uniformity of the flux is permissible without adversely affecting the linear characteristics of the meter, although for very accurate meters this deviation is kept at less than one-half percent.

Magnetic circuit 11 is rigidly held in position on base 10 by legs 69 and 70 integral with the base and which have downwardly facing latch edges 71 and 72 respectively, which engage horizontal faces of notches 73 and 74 respectively in the upper yoke element 51 to hold the magnetic circuit firmly in position against a support pad 75 formed on the bottom of base 10. The magnetic circuit is located in a fore and aft direction on base 10 by a rear locating post 76 which engages the rear faces of both the magnet and lower yoke element 53, and a front locating post 77 which engages a locating surface 78 in a notch 79 at the front of the magnet and which also engages the front surface of the lower yoke element at a location on each side of a notch 79 in the lower yoke element. The sides of locating post 77 position lower yoke element 53 circumferentially on the base 10. There is only one notch 79 in the magnet. In addition to providing a locating surface 78, the notch 79 provides for mounting the magnet in the base 10 in only one position, namely the position shown, for example, at FIG. 5 where the notch is adjacent post 77. The top edge 81 of the projection 82 of post 77 prevents installing the magnet in any other position, such as upside down or with the notch 79 facing toward post 76. Hence, the magnet is always installed in the same position in successively constructed meters and correspondingly, repeatable accuracy of the meter is assured.

Figure 5:
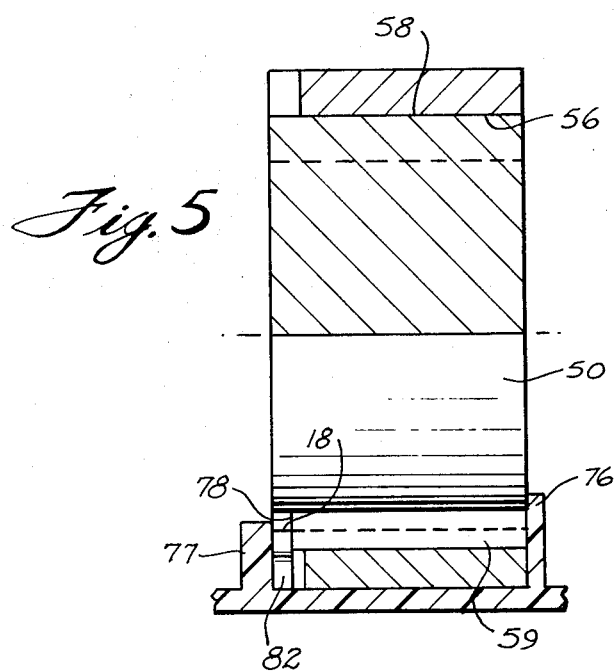
FIG. 5 is a view in section taken along line 5—5 of FIG. 4.

The embodiment of FIGS. 4 and 5 provide for assembling the meter by first pressing lower yoke element 53 into the base, then installing coil assembly 12, then inserting magnet 50, and finally pressing upper yoke element 52 into position on the lower yoke element so the arms 69 and 70 snap over the surfaces 73 and 74 to hold the magnet and yoke element in position.

Magnet 50 is formed from a material with good magnetically retentive characteristics, such as LODEX, whereas the yoke ring 50 is formed from magnetic material with non-retentive characteristics and low magnetic reluctance, such as soft iron.

Figure 6:
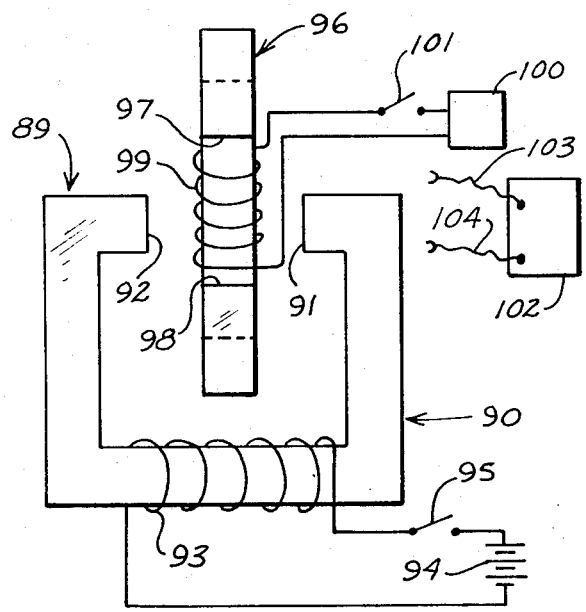
FIG. 6 is a diagrammatic view of apparatus for calibrating the meter.

After the meter is balanced and is completely assembled in case 4, knob 7 is manipulated to set pointer 15 to its zero position on scale 5, then the meter is calibrated. Such calibration is accomplished with the calibrating equipment 89 of FIG. 6. The equipment includes an electro-magnet 90 with pole faces 91 and 92 spaced apart a distance slightly greater than the distance between the sides of body 36 of case 4. Electro-magnet 90 is energized by energizing coil 93 from a direct current source 94 by closing switch 95. There is a second electro-magnet 96 with opposed pole faces 97 and 98 which extend transverse to the pole faces 91 and 92 so a generally rectangular opening is formed between the pole faces 91, 92 and 97, 98. Electro-magnet 96 has a coil 99 which is energized from a source of alternating current 100 by closing a switch 101. The distance between pole tips 97 and 98 is only slightly greater than the height of body 36, so the body can be positioned between the pole tips after the meter is assembled. The calibration equipment also includes a power source 102 with leads 103 and 104 for connection to the terminals of the meter to energize coil 20 of the meter. Power source 102 is preferably a direct current source, but can also be an alternating current source if the assembled meter includes rectifiers for the measurement of alternating current.

Figure 7:
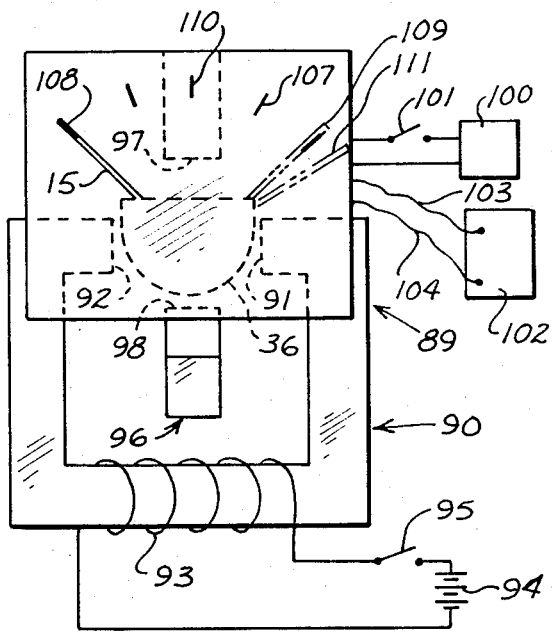
FIG. 7 is a view corresponding to FIG. 6 and showing an assembled meter positioned in the apparatus of FIG. 6 for calibration.

FIG. 7 shows the assembled meter in position in the calibration equipment. It will be observed that the scale 5 has graduations 107 thereon which are spaced apart precisely the same angular distance. In an accurate meter, the pointer 15 must swing from the zero position 108 to the full scale position 109 when a predetermined current is applied to the terminals of the meter. In addition, with the linear meter of this invention, pointer 15 moves to a half scale position 110 when only half the current is applied to the terminals. The sensitivity of the meter determines the current required to move the pointer to the full scale position 109. For example, if the sensitivity of the meter is 100 micro-amps, applying 100 micro-amps to the terminals of the meter must cause the pointer to swing to the full scale position 109. Correspondingly, applying 50 micro-amps to the meter terminals must cause the pointer to swing to the half scale position 110 and at any intermediate position between zero position 108 and full scale position 109 the deflection of the pointer must be directly proportional to the current applied to the terminals.

For purposes of economy of construction, it is in many instances desirable to use the same coil assembly 12 with coil 20 of the same wire and same number of turns for meters of several different sensitivities. For example, the meter can be so designed that the coil 20 deflects to the full scale position 109 when 100 microamps of current are in the coil. Hence, where it is desired to provide different sensitivities, such as 200 micro-amps or 500 micro-amps, resistors such as the resistors 35 or 35' can be connected either in series with or in shunt across the coil to change the sensitivity of the meter. In the past, such resistors have been of precision manufacture to assure that the proper portion of the current applied to the meter terminals flows through the coil 20 to deflect the coil and pointer. In accordance with this invention, these resistors need not be of precision manufacture since the meter is calibrated after such resistors, when used, are connected to the coil.

A feature of both the taut band suspension of FIGS. 1 and 2 and the spiral spring-pivot bearing arrangement (FIG. 3), which is quite significant to the meter of this invention, is that the spring and taut band each resist deflection of the coil assembly in direct proportion to the extent of angular deflection of the assembly from a zero position. Such resistance to deflection in direct proportion to the extent of the deflection is an inherent characteristic of spiral and torsion type springs. Hence, both the taut band suspension and the spiral spring arrangement exert a restoring force on the coil which is directly proportional to the extent of deflection of the pointer 15 from its zero position 108. The deflection of coil 20, resulting from applying a current to the coil, is directly proportional to the current in the coil because the flux density in each of the gaps 64 and 65 is the same for any position of the coil within its angle of travel 67. Since both the spring force resisting deflection and the force resulting from energizing the coil are linear, the deflection of the coil in response to a current in the coil is also linear.

Calibration of the assembled meter will now be explained with reference to FIG. 7. First, the meter is positioned in the calibrating equipment with the body 36 in the opening between the respective pole faces 91, 92, and 97, 98. Then, leads 103 and 104 are connected respectively to the terminal conductors 31 and 32 of the meter. Then, switch 95 is closed to energize electromagnet 90 to magnetize magnet 50 transverse to its axis and in a generally horizontal direction. Advantageously, the magnet 50 is over-magnetized by this magnetizing step so applying the rated current to the meter terminals from the power source 102 causes pointer 15 to deflect to a position 111 which is beyond its full scale position. Then, magnet 50 is de-magnetized in a step-by-step fashion by energizing electro-magnet 96 from its power source 100, until pointer 15 reaches the full scale position 109. Since the calibration is performed after the meter is completely assembled, variables, such as the tolerances of resistors 35 and 35' (when used) or the effects of rectifiers (when used) are compensated for by this calibration technique. In addition, since the deflection characteristics of the meter are linear, applying half the rated current will cause the pointer to deflect to the half scale position 110. By virtue of this technique, and the construction described herein, a meter with linear deflection characteristics is provided which has good accuracy (on the order of 2 percent) and which is capable of manufacture by mass production methods. A distinct advantage of the linear deflection characteristics is that the number of different scale plates required by prior art meters is dispensed with, since all the scale plates have the same linear or equally spaced graduations whenever a linear characteristic is measured with the meter.

While a preferred embodiment of the meter has been described in detail, and while a preferred method of calibration has also been described, it is to be understood that numerous changes and variations can be made without departing from the scope of this invention as defined herein and in the appended claims.

What is claimed is:

1. A moving coil measuring instrument wherein deflection of the coil is directly proportional to the current in the coil, and wherein the instrument is adapted to be calibrated after assembly by magnetizing a magnet of the instrument to a required extent; comprising in combination, an adjustment free magnetic circuit comprising a pair of unitary yoke pieces abutting each other to form a ring shaped two piece yoke, and a core within and magnetically connected to said yoke, one of said yoke and core being of magnetic material and the other of said yoke and core including a fixed unitary permanent magnet; said yoke and core having fixed, abutting, cooperating locating surfaces for mounting said yoke and core in only one predetermined aligned position with respect to each other; opposed surface means of said yoke and core defining a coil receiving gap therebetween; a coil assembly; means mounting said coil assembly with a portion thereof extending through said gap and for movement through a predetermined angle of rotation at least as great as the angular deflection of the coil from a zero position to a full scale position; said opposed surface means cooperating with said magnet to provide flux which cuts the coil, the sum total of said flux which cuts the coil being substantially the same for any position of said coil within said predetermined angle of rotation; whereby deflection of said coil in said gap is directly proportional to the current in said coil.

2. A measuring instrument according to claim 1 wherein said opposed surface means of said yoke and core cooperate to provide a crescent shaped gap; and the flux density in said gap is substantially uniform throughout said predetermined angle of rotation of said coil.

3. A measuring instrument according to claim 1 wherein said cooperating locating surfaces include first and second fixed locating surfaces on said core, said yoke includes first and second fixed locating surfaces in engagement respectively with said locating surfaces of said core; whereby, said core is in a predetermined fixed position relative to said yoke.

4. A measuring instrument according to claim 3 wherein said first and second locating surfaces of said core are generally rectangular; and said first and second locating surfaces of said yoke include rectangular slots to receive said rectangular portions of said core whereby, said core is maintained in a fixed position within said yoke.

5. A measuring instrument according to claim 1 wherein said yoke is of uniform cross-sectional configuration; said core is of uniform cross-sectional configuraton; said opposed surface means defining said gap include a smooth arcuately curved inner surface of said yoke and a smooth arcuately curved exterior surface of said core.

6. A moving coil measuring instrument wherein deflection of the coil is directly proportional to the current in the coil, comprising in combination, a magnetic circuit comprising an adjustment free hollow yoke of magnetic material, and a unitary permanent magnet in fixed abutting relation with respect to, and clamped within said yoke; said yoke having an inner surface in opposed relation to an outer surface of said magnet, said inner surface and said outer surface defining a coil receiving gap therebetween; a coil assembly; means mounting said coil assembly with a portion thereof extending through said gap and for movement through a predetermined angle of rotation at least as great as the angular deflection of the coil from a zero position to a full scale position; said mountng means including means exerting an opposing force on said coil proportional to the angular deflection of said coil from said zero position; said opposed surfaces of said magnet and yoke providing a flux gap in which the sum total of the flux which cuts the coil is substantially the same for any position of said coil within said predetermined angle of rotation of the coil assembly so that the magnetic circuit requires no adjustment but can be calibrated by permanently magnetizing the permanent magnet after assembly; whereby, deflection of said coil assembly in said gap is directly proportional to the current in the coil.

7. A measuring instrument according to claim 6 wherein said means mounting said coil assembly for rotation includes taut band suspension means extending between said coil assembly and a supporting base.

8. A measuring instrument according to claim 6 wherein said means mounting said coil assembly for rotation includes pivot bearing means extending between said coil assembly and a supporting base.

9. An instrument according to claim 6 wherein said magnet includes means to permit installation thereof in only one predetermined oriented position.

10. An instrument according to claim 9 wherein said instrument includes a base having a positioning surface, and said means on said magnet includes a notch cooperating with said surface to permit mounting said magnet in only one predetermined oriented position.

11. A measuring instrument according to claim 6 wherein said yoke is comprised of two semi-circular yoke elements, and said magnet is clamped between said yoke elements.

12. A method of making a linear scale meter of predetermined sensitivity comprising in combination, the steps of providing a movable coil; providing an adjustment free magnetic circuit having a permanent magnet and a flux gap and with a portion of the coil in said gap, said magnetic circuit including an adjustment free two piece yoke, said gap and coil cooperating so the sum total of the flux in the gap which cuts the coil is the same for any operative position of the coil in the gap; changing the magnetization of said permanent magnet with a magnetizing source separate from the meter while applying a predetermined current to said coil until said coil deflects to a predetermined calibration position; and removing the meter from the magnetizing source.

13. A method according to claim 12 wherein said step of providing a coil includes connecting a resistor between said coil and a terminal of the meter before changing the magnetization of said magnet; and said step of applying a predetermined current to said coil includes applying said current to the meter terminals.

14. A method according to claim 12 wherein said steps of providing a magnetic circuit and providing a coil include providing an assembled meter movement, and wherein the method further includes placing said movement in a casing; mounting a linear scale adjacent said pointer; and adjusting the zero position of said pointer prior to changing the magnetization of said magnet.

15. A method of calibrating an electric meter of predetermined sensitivity comprising in combination, the steps of, providing a movable coil; providing a magnetic circuit having a permanent magnet and a flux gap, and with a portion of the coil in said gap; connecting a resistor between the coil and a terminal of the meter; subsequently changing the magnetization of said permanent magnet with a magnetizing source separate from the meter while applying a predetermined current to said coil through said resistor until said coil deflects to a predetermined calibrated position; and removing the meter from the magnetizing source.

16. A method according to claim 15 wherein said gap and coil cooperate with each other so the sum total of flux in the gap which cuts the coil is the same for any operative position of the coil in said gap.

17. A method according to claim 15 wherein said step of connecting said resistor between said coil and a terminal of the meter includes mechanically supporting said resistor on a supporting base of said magnetic circuit.

* * * * *